United States Patent
Yao et al.

(10) Patent No.: US 7,263,559 B2
(45) Date of Patent: Aug. 28, 2007

(54) METHOD FOR PREVENTING IP ADDRESS CHEATING IN DYNAMIC ADDRESS ALLOCATION

(75) Inventors: Xi Yao, Shenzhen (CN); Yihong Xiu, Shenzhen (CN); Ning Pan, Shenzhen (CN)

(73) Assignee: Huawei Technologies Co., Ltd., Shenzhen, Guangdon (CN)

( * ) Notice: Subject to any disclaimer, the term of this patent is extended or adjusted under 35 U.S.C. 154(b) by 872 days.

(21) Appl. No.: 10/600,536

(22) Filed: Jun. 23, 2003

(65) Prior Publication Data

US 2004/0006712 A1    Jan. 8, 2004

(30) Foreign Application Priority Data

Jun. 22, 2002    (CN) ............................... 02 1 25007

(51) Int. Cl.
    *G06F 15/16*    (2006.01)
(52) U.S. Cl. .................. 709/230; 713/189; 713/190
(58) Field of Classification Search ............... 713/160, 713/153, 189, 190; 709/230; 370/390

See application file for complete search history.

(56) References Cited

U.S. PATENT DOCUMENTS

| | | | |
|---|---|---|---|
| 6,993,026 B1 * | 1/2006 | Baum et al. ................ | 370/392 |
| 2002/0016858 A1 * | 2/2002 | Sawada et al. ............ | 709/238 |
| 2002/0075844 A1 * | 6/2002 | Hagen ........................ | 370/351 |

* cited by examiner

*Primary Examiner*—Krisna Lim
(74) *Attorney, Agent, or Firm*—Bacon & Thomas, PLLC

(57) ABSTRACT

Disclosed is a method for preventing IP address cheating in dynamic address allocation. Firstly, check the source MAC address and the source IP address involved in an ARP packet sent from a subscriber terminal, i.e., detect whether there is a matching item in the legal subscriber address table; if so, process it normally, otherwise discard the ARP packet. In this way, an illegal subscriber cannot access to network through IP address cheating, but a legal subscriber can operate normally and continuously. For a subscriber terminal with a static IP address, a static item table is set in the legal subscriber address by manual configuration. When a new subscriber terminal asks for being allocated an IP address, check whether the IP address to be allocated has been set as a static item; if so, inform the subscriber terminal of applying for another IP address. In this way, it is guaranteed that static IP address having been allocated to a subscriber terminal will not be re-allocated, and it is avoided that the subscriber terminal with legal static IP address cannot access to network normally due to the re-allocation of IP address.

7 Claims, 2 Drawing Sheets

METHOD FOR PREVENTING IP ADDRESS CHEATING IN DYNAMIC ADDRESS ALLOCATION

FIELD OF THE TECHNOLOGY

The invention relates to an access method of communication network, specifically to a dynamic address allocation method used in a wideband network.

BACKGROUND OF THE INVENTION

With the rapid growth of network capacity and vast increase of network complexity, network configuration is getting more complicated. Thus the DHCP (Dynamic Host Configuration Protocol) based on the BOOTP (Bootstrap Protocol) has come into being. With a large expansion, it has been widely used. The DHCP can dynamically assign a duration-limited IP address to an access subscriber terminal. When the duration is ended or the subscriber terminal definitely shows that it would discard the IP address, the IP address can be used by other subscriber terminals. In this way, the efficiency of resource utilization is raised. The dynamic allocation can be used when assigning an IP address to a temporary access subscriber terminal or a group of subscriber terminals that share a group of limited IP addresses and need not permanent IP address. While a new access subscriber terminal needs a permanent access to a network, but the network IP address is very limited, in order to recover the IP address when the subscriber need not permanently access to the network again in the future, the dynamic allocation can also be used.

FIG. 1 shows an actual network application environment of the present invention. The network comprises a 3-level exchange with DHCP relay functionality, a main DHCP server and a backup DHCP server in one segment of the network connecting to the exchange, and DHCP clients, i.e., subscriber terminals, in another segment of the network.

In DHCP, the dynamic IP address allocation is performed through the exchange of DHCP packets between the DHCP server and subscriber terminals. The DHCP packet is a broadcast packet, which cannot cross into another segment of the network, so a DHCP server can only serve subscriber terminals in its own segment. Owing to resource limitation, it is impossible to configure a DHCP server for each network segment, and a DHCP server is usually set at a stand-alone segment for security reason. Therefore, it is necessary for a DHCP server to serve subscriber terminals in other network segments. The relay function of DHCP makes DHCP broadcast packets re-transmitted between segments of a network. By this means, a DHCP server can serve subscriber terminals in different segments.

In a network running DHCP, some subscriber terminals get IP addresses without through DHCP server but through illegally occupying them assigned to other clients. At present, the problem of IP address cheating is dealt with as follow: during bootstrap, the computer system of a subscriber terminal sends out a charge-free ARP (Address Resolution Protocol) packet to check whether its IP address has been occupied; if so, the computer system will send out an address contention report. While this method cannot solve the problem of IP address cheating root and branch, an IP address cheater may still get access to network.

SUMMARY OF THE INVENTION

It is an object of the invention to provide a method for preventing IP address cheating in dynamic address allocation. With this method, an illegal user cannot obtain access to a network by IP address cheating, so this method can completely prevent IP address cheating during dynamically allocating an IP address, and can thoroughly ensure the normal usage for legal users.

The method according to the present invention comprises steps as follow. The exchange checks the source MAC (Medium Access Control) address (hardware address of network adapter) and the source IP address in the ARP packet sent from the subscriber terminal, namely, determine whether there is a matching item in the legal subscriber address table. If there is a matching item in it, the process is dealt with normally, i.e., add the source IP address and the source MAC address in the ARP packet sent from the subscriber terminal as an item to the ARP table, so as to make it possible for the subscriber terminal to access to the network. Otherwise, the packet is discarded.

The method further includes adding a message of a new subscriber terminal to the legal subscriber address table, which includes the following steps:

(21) the subscriber terminal sending a DHCPDISCOVER packet to the DHCP server via the DHCP relay;

(22) the DHCP server sending a DHCPOFFER response packet to the subscriber terminal via the DHCP relay;

(23) the subscriber terminal sending a DHCPREQUEST packet to the DHCP server via the DHCP relay;

(24) the DHCP relay receiving a DHCPACK response packet from the DHCP server;

(25) the exchange searching the existed legal subscriber address table to detect whether the IP address allocated to the subscriber terminal has been set as a static item; if so, going to Step (26), otherwise going to Step (27).

In Step (26), the exchange sends a DHCPDECLINE packet to the DHCP server to add a mark for the allocated IP address; meanwhile, the exchange sends a DHCPNAK packet to the subscriber terminal to inform it of applying for another IP address, then go to Step (21) to continue an IP address application.

In Step (27), the exchange performs re-transmission, and writes the IP address and the MAC address allocated to the subscriber into the legal subscriber address table.

In the above-mentioned steps, the static item is a message of a subscriber terminal with a static IP address. The static item is added or deleted according to the actual usage situation of the subscriber terminal with the static IP address, either by means of command line or manual configuration from the network administrator.

The deletion processing includes steps as follow. When the static item of an IP address has been deleted by means of command line or manual configuration from the network administrator, the exchange sends a DHCPREQUEST packet to the server to delete the mark of the allocated static IP address. Then, the exchange sends a DHCPRELEASE packet to the DHCP server to release the IP address so that it can be dynamically allocated to other users.

The method checks whether the ARP packet sent from a subscriber terminal has a legal address. If there is no matching item in the legal subscriber address table, the packet is discarded. Therefore, an illegal subscriber cannot access to network through IP address cheating, but a legal subscriber can operate normally and continuously. In this way, the problem of IP address cheating is completely solved.

For the subscriber terminal with static IP address, the static item is manually configured into the legal subscriber address table. When a new subscriber terminal asks for an IP address, it is detected whether the IP address to be allocated is in the static items. If so, the subscriber terminal is informed of applying for another IP address. In this way, it is guaranteed that static IP address having been allocated to a subscriber terminal will not be re-allocated, and it is avoided that the subscriber terminal with legal static IP address cannot access to network normally due to the re-allocation of IP address.

BRIEF DESCRIPTION OF THE DRAWINGS

The present invention is illustrated by way of example and not limited in the following figures, in which.

DETAILED DESCRIPTION OF THE INVENTION

The invention is further described hereinafter, with reference to the drawings and embodiments.

Figure 1:
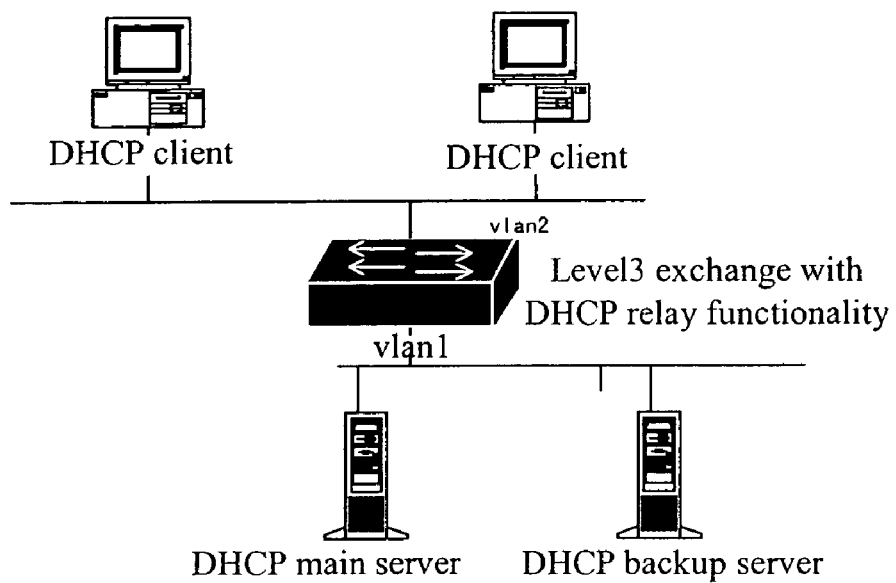
FIG. 1 schematically shows the network application environment of the invention.
Figure 2:
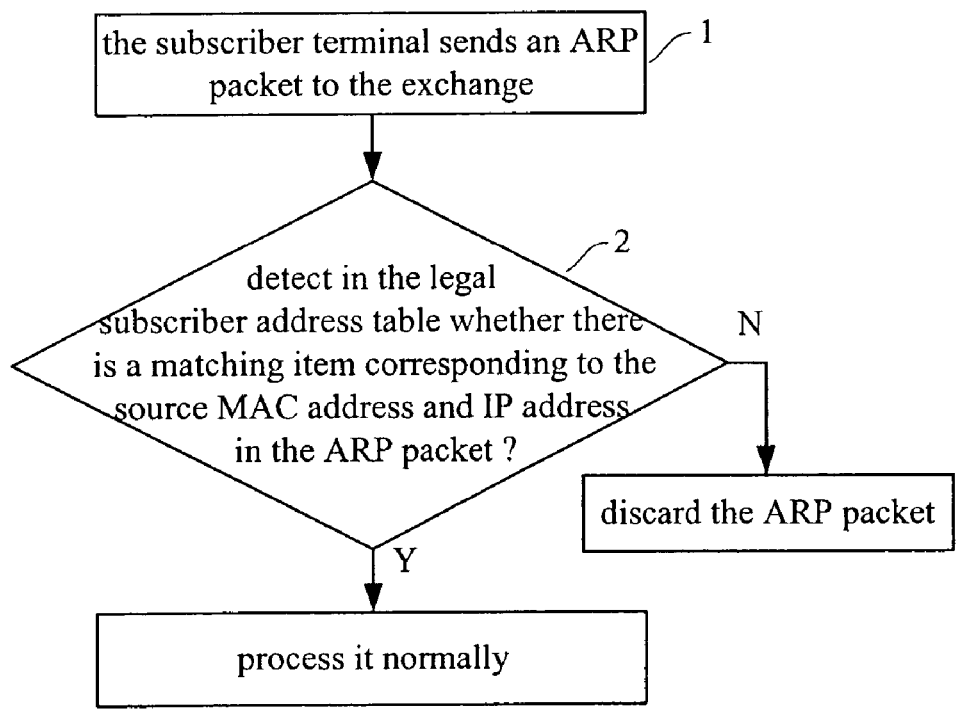
FIG. 2 shows a flowchart according to an embodiment of the invention.

As shown in FIG. 2, the processing steps in the method for preventing IP address cheating in dynamic address allocation comprises as follow.

At Step 1, a subscriber terminal sends the exchange an ARP packet, which involves MAC address and IP address of the subscriber terminal. The ARP packet can be divided into two kinds: request packet and reply packet.

At Step 2, the exchange checks the MAC address and the IP address in the ARP packet, i.e., determines whether there is a matching item in the legal subscriber address table. If there is a matching item, it shows that the subscriber terminal has obtained the IP address legally via the DHCP relay, and the processing is continued normally, i.e., add the source MAC address and source IP address in the ARP packet sent from the subscriber terminal to the ARP table so as to make it possible for the subscriber terminal to access to the network. If there is no matching item in the legal subscriber address table, it means the IP address is obtained illegally; then discard the ARP packet. Therefore, there is no item created with this IP address, and the illegal subscriber with this illegal IP address cannot access to the network.

Figure 3:
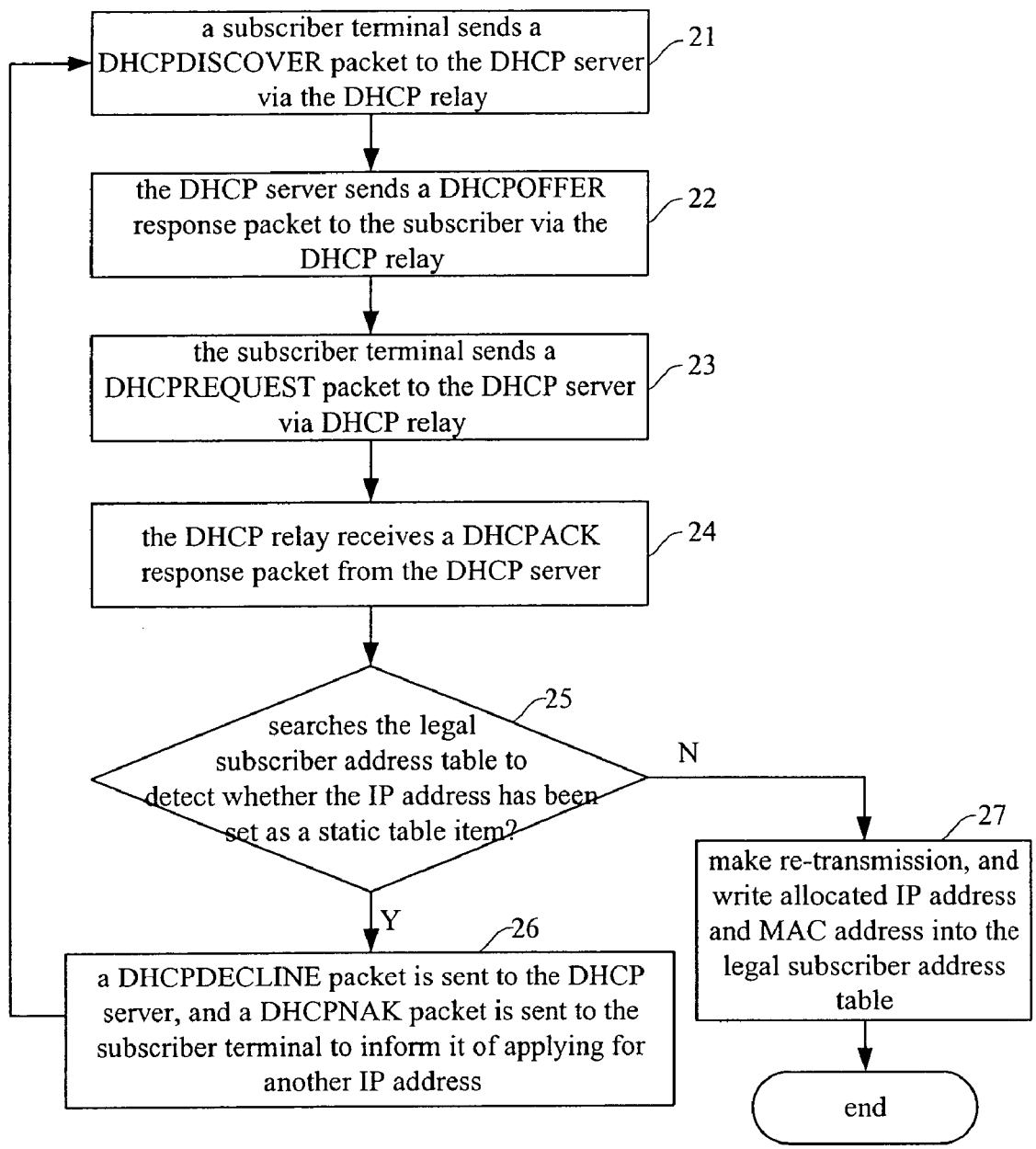
FIG. 3 shows a flowchart of creating a message of new subscriber terminal in the legal subscriber address table.

As shown in FIG. 3, it comprises the following steps to add a message of new subscriber terminal to the legal subscriber address table.

At Step 21, a subscriber terminal sends a DHCPDISCOVER packet to the DHCP server via the DHCP relay, asking for service from the DHCP server.

At Step 22, the DHCP server sends a DHCPOFFER response packet to the subscriber terminal via the DHCP relay, showing that the DHCP server can offer service.

At Step 23, the subscriber terminal sends a DHCPREQUEST packet to the DHCP server via the DHCP relay, asking for an IP address.

At Step 24, the DHCP relay receives from the DHCP server a DHCPACK response packet which involves an IP address allocated to the subscriber, mask codes and other configuration information, such as gateway address etc.

At Step 25, the exchange searches the existed legal subscriber address table to detect whether the IP address has been set as a static item. If so, go to Step 26, otherwise go to Step 27.

At Step 26, the exchange sends a DHCPDECLINE packet to the DHCP server to tell it that the IP address has been allocated and inform it of adding a mark for the allocated IP address. Further, the exchange sends a DHCPNAK packet to the subscriber terminal to inform it of applying for another IP address. Then go to Step 21 to apply for an IP address again.

At Step 27, the exchange performs re-transmission, and writes the IP address and the MAC address allocated to the subscriber terminal into the legal subscriber address table.

The above-mentioned static item is described in more detail hereinafter.

Some subscriber terminals need static IP addresses, but a static IP address cannot be obtained through DHCP packet. Therefore, there is no corresponding item in the legal subscriber address table. In order to make a subscriber terminal can pass the IP address check and access to a network normally, a static item is set for a static IP address in the legal subscribe address table. The static item shows information about a subscriber terminal with static IP address. A static item is added or deleted according to the actual usage of a subscriber terminal with the static IP address, by means of either command line or manual configuration from the network administrator. As mentioned in the Steps 24, 25 and 26, when the DHCP relay receives a DHCPACK response packet from the DHCP server, the exchange searches the legal subscriber address table. If the IP address has been set as a static item, then the exchange sends a DHCPDECLINE packet to the DHCP server and mark that the IP address has been allocated. In this instance, the IP address will not be allocated to other subscriber terminals by the DHCP server. Meanwhile, the exchange sends a DHCPNACK packet to the subscriber terminal to inform it of applying for another IP address.

When a subscriber terminal with a static IP address does not need the static IP address, the static item is deleted manually. At the same time, the exchange sends a DHCPREQUEST request packet and a DHCPRELEASE packet to the DHCP server, and deletes the mark showing the IP address has been allocated. Therefore, the IP address can be re-allocated to other subscriber terminals by the DHCP server.

The forgoing embodiment is merely exemplary and is not to be construed as limiting the present invention. The description of the present invention is intended to be illustrative, and not to limit the scope of the claims. Many alternatives, modifications, and variations will be apparent to those skilled in the art.

What is claimed is:

1. A method for preventing IP address cheating in dynamic address allocation, comprising:

detecting, by using an exchange, in a legal subscriber address table whether there is a matching item corresponding to the source Medium Access Control (MAC) address and the source Internet Protocol (IP) address involved in an Address Resolution Protocol (ARP) packet which is sent from a subscriber terminal; if so, adding the source IP address and the source MAC address involved in the ARP packet to the ARP table so as to make it possible for the subscriber terminal to access to network; otherwise, discarding the ARP packet.

2. The method of claim 1, further comprising adding a message of a new subscriber terminal to said legal subscriber address table.

3. The method of claim 2, wherein said step of adding a message of a new subscriber terminal to the legal subscriber address table comprises:
- (21) sending a DHCPDISCOVER packet from a subscriber terminal to the DHCP server via the DHCP relay;
- (22) sending a DHCPOFFER response packet from the DHCP server to the subscriber terminal via the DHCP relay;
- (23) sending a DHCPREQUEST packet from the subscriber terminal to the DHCP server via the DHCP relay;
- (24) returning a DHCPACK response packet from the DHCP server to the DHCP relay;
- (25) searching, by using the exchange, the legal subscriber address table to detect whether the IP address allocated to the subscriber has been set as a static item; and
- (26) sending a DHCPDECLINE packet from the exchange to the DHCP server to inform it of adding a mark for the allocated IP address; meanwhile sending a DHCPNAK packet to the subscriber terminal to inform it of applying for another IP address; then going to Step (21) to apply for another IP address; or
- (27) re-transmitting, by using the exchange, and adding the IP address and the MAC address allocated to the subscriber terminal to the legal subscriber address table.

4. The method of claim 3, wherein the static item is a message of a subscriber terminal with a static IP address.

5. The method of claim 4, wherein the static item is added or deleted according to real application situation of the corresponding subscriber terminal with the static IP address.

6. The method of claim 5, wherein the static item is added or deleted by means of a command line or manual configuration from the network administrator.

7. The method of claim 3, further comprising:
- deleting a static item corresponding to a static IP address from the legal subscriber address table;
- sending a DHCPREQUEST request packet from the exchange to the DHCP server to inform it of deleting the mark for the allocated IP address; and
- sending a DHCPRELEASE packet from the exchange to the DHCP server to release the IP address so that the IP address can be dynamically allocated to other subscribers.

* * * * *